United States Patent
Chu et al.

(10) Patent No.: US 9,112,582 B2
(45) Date of Patent: Aug. 18, 2015

(54) NETWORK APPARATUS AND METHOD FOR ELIMINATING INTERFERENCE BETWEEN TRANSPORT PORTS

(75) Inventors: Yuan-Jih Chu, Hsinchu (TW);
Liang-Wei Huang, Hsinchu (TW);
Hsuan-Ting Ho, Taichung (TW);
Chih-Jung Chiang, New Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 158 days.

(21) Appl. No.: 13/609,280

(22) Filed: Sep. 11, 2012

(65) Prior Publication Data

US 2013/0114390 A1 May 9, 2013

(30) Foreign Application Priority Data

Nov. 8, 2011 (TW) .................................. 100140792

(51) Int. Cl.
*H04B 3/32* (2006.01)

(52) U.S. Cl.
CPC ........................................ *H04B 3/32* (2013.01)

(58) Field of Classification Search
CPC ......... H04B 1/38; H04B 3/32; H04L 27/2691
See application file for complete search history.

(56) References Cited

U.S. PATENT DOCUMENTS

| 5,664,011 | A | 9/1997 | Crochiere |
| 2007/0263857 | A1 | 11/2007 | Sharon |
| 2009/0109834 | A1* | 4/2009 | Huang et al. .................. 370/201 |
| 2009/0180409 | A1* | 7/2009 | Huang et al. .................. 370/290 |
| 2009/0198754 | A1* | 8/2009 | Chang et al. .................. 708/319 |
| 2010/0034374 | A1* | 2/2010 | Ohman et al. ........... 379/406.06 |
| 2010/0115316 | A1* | 5/2010 | Diab ............................. 713/323 |
| 2011/0058667 | A1* | 3/2011 | Takada .................... 379/406.08 |

FOREIGN PATENT DOCUMENTS

| CN | 101471791 A | 7/2009 |
| CN | 101652933 A | 2/2010 |
| TW | 200503477 | 1/2005 |
| TW | 200931820 | 7/2009 |
| TW | 201012153 | 3/2010 |
| TW | 201032572 | 9/2010 |

* cited by examiner

*Primary Examiner* — Gregory Sefcheck
*Assistant Examiner* — Jenkey Van
(74) *Attorney, Agent, or Firm* — Winston Hsu; Scott Margo

(57) ABSTRACT

A network apparatus for eliminating interference between transport ports includes a plurality of transport ports, a plurality of seed comparators, and a control unit. The plurality of seed comparators are coupled to the plurality of transport ports, respectively, wherein a first seed comparator is utilized for comparing a first seed of a first transport port with a second seed of a second transport port and accordingly generating a comparing result. The controlling unit is coupled to the plurality of seed comparators and the plurality of transport ports, for generating a control signal to cancel interference between the plurality of transport ports according to the comparing result.

11 Claims, 4 Drawing Sheets

NETWORK APPARATUS AND METHOD FOR ELIMINATING INTERFERENCE BETWEEN TRANSPORT PORTS

BACKGROUND OF THE INVENTION

1. Field of the Invention

The present invention relates to a network apparatus and related method thereof, and more particularly, to a network apparatus for eliminating interference between transport ports and related method thereof.

2. Description of the Prior Art

Generally speaking, a network apparatus (e.g., a switch) with a plurality of transport ports often encounters interference from other transport ports. For example, in order to reduce the production cost, a transformer of a multi-port switch frequently has coils of two or four transport ports disposed in the same element. As the internal coils of the transformer make signals interfere with each other, the signal quality would be degraded due to interference between adjacent transport ports.

Therefore, how to eliminate interference between transport ports has become a technical problem should be resolved by the person skilled in the relevant art.

SUMMARY OF THE INVENTION

It is therefore one objective of the present invention to provide a network apparatus, which eliminates interference/cross-talk between transport ports by using seed information, to solve the above-mentioned problem.

According to an embodiment of the present invention, an exemplary network apparatus for eliminating interference between transport ports is disclosed. The exemplary network apparatus includes a plurality of transport ports, a plurality of seed comparators, and a control unit. The seed comparators are coupled to the transport ports, respectively, and a first seed comparator of the seed comparators is utilized for comparing a first seed of a first transport port with a second seed of a second transport port in order to generate a comparing result. The control unit is coupled to the first seed comparator, and used for generating a control signal to cancel interference between the transport ports according to the comparing result.

According to an embodiment of the present invention, an exemplary method for eliminating interference between transport ports is disclosed. The exemplary method includes: providing a plurality of transport ports; comparing a first seed of a first transport port with a second seed of a second transport port in order to generate a comparing result; and generating a control signal to cancel interference between the transport ports according to the comparing result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
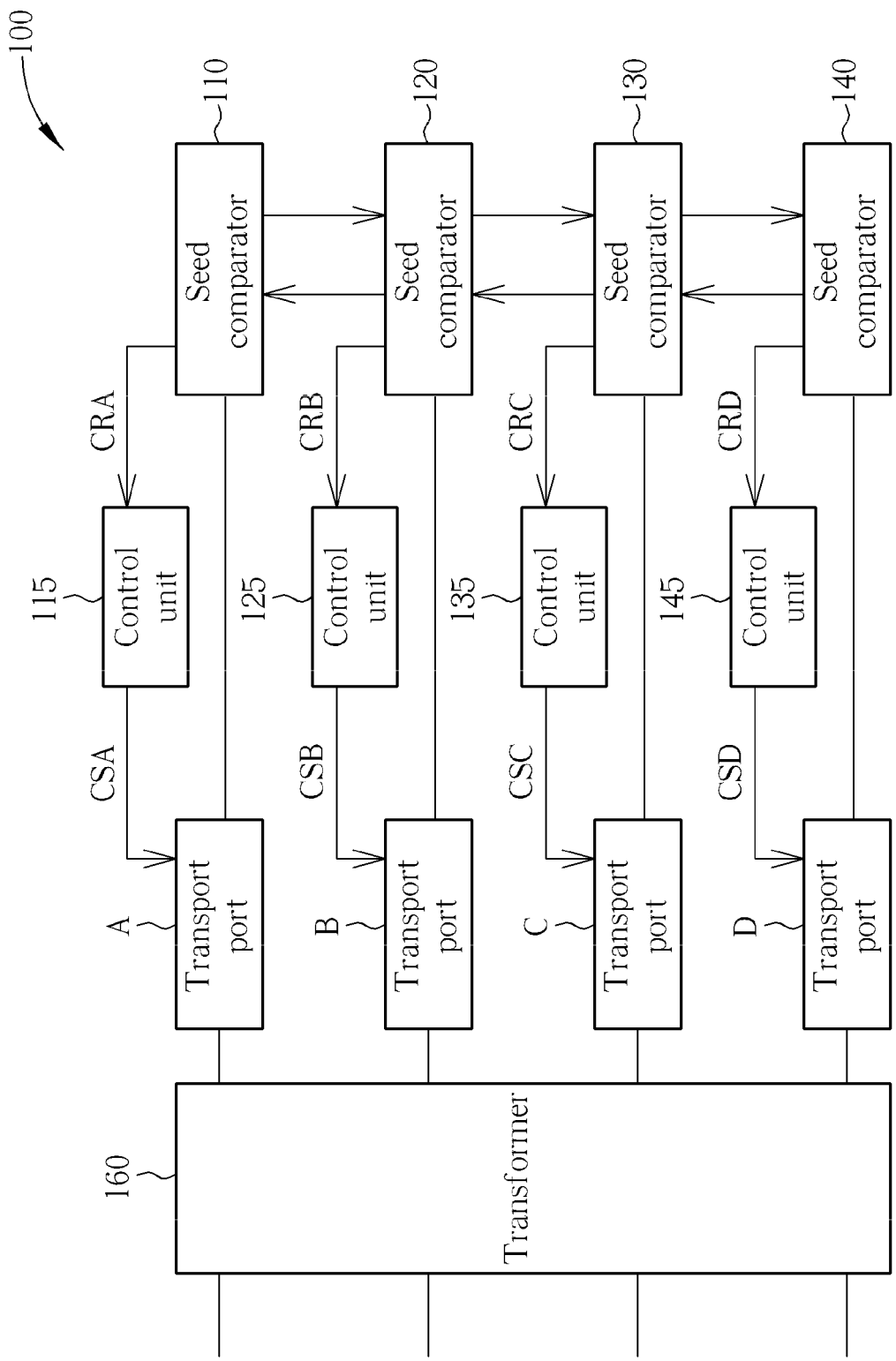
FIG. 1 is a diagram illustrating an exemplary network apparatus for eliminating interference between transport ports according to an embodiment of the present invention.

Please refer to FIG. 1, which is a diagram illustrating an exemplary network apparatus for eliminating interference between transport ports according to an embodiment of the present invention. For clarity and simplicity, the network apparatus 100 in this embodiment is exemplarily implemented by a four-port switch. However, this is for illustrative purposes only, and is not meant to be a limitation of the present invention. As shown in FIG. 1, the network apparatus 100 includes, but is not limited to, a plurality of transport ports A-D, a plurality of comparators 110-140, a plurality control units 115-145, and a transformer 160. The seed comparators 110-140 are coupled to the transport ports A-D, respectively, wherein each of the seed comparators is utilized for comparing a time distance between a first seed of a corresponding transport port and a second seed of an adjacent transport port to thereby generate a comparing result CR. By way of example, in a case where a seed seed_A corresponds to a transport port A, a seed seed_B corresponds to a transport port B, a seed seed_C corresponds to a transport port C, and a seed seed_D corresponds to a transport port D, the seed comparator 110 may compare a time distance between the first seed (i.e., the seed seed_A) and the second seed (i.e., the seed seed_B) to generate a comparing result CRA, the seed comparator 120 may compare the first seed (i.e., the seed seed_B) with the second seed (i.e., the seed seed_A and the seed seed_C) to generate a comparing result CRB, and the rest can be deduced by analogy.

In addition, the control units 115-145 are coupled to the seed comparators 110-140, respectively, and used to generate a control signal CS (e.g. the control signal CSA, CSB, CSC, or CSD) to cancel interference between the transport ports according to the comparing result CR (e.g. the comparison result CRA, CRB, CRC, or CRD). Please note that each of the transport ports A-D may have a same seed, and the same seed has a cycle. For example, a seed may be selected from an initial value of a register (e.g., an 11-bit register). The initial value of the register is thus a Pseudo-Noise (PN) sequence having a 2047-bit length as well as periodicity, where the PN sequence cycles per 2047 bits. In other words, the cycle of the seed is 2047. In addition, a transmission signal is generated after logic operations are performed upon the seed and the data stream. Therefore, by utilizing the cycle characteristics of the seed, it may be determined whether the transmission signal to be cancelled is generated from the transport port itself or the interference caused by adjacent transport ports by referring to the time distance between the first seed and the second seed of the adjacent transport port (i.e., the approach, overlap, and/or departure of the first seed and the second seed).

Please note that the aforementioned network apparatus 100 may be, but is not limited to, a switch, and may also be other kinds of network apparatuses. Moreover, the number of transport ports and the number of channels are for illustrative purposes only, and are not meant to be limitations of the present invention. Please note again that the network apparatus 100 may be applied to a 10 M/100 M Base-T system, a 1 G Base-T system, or a 10 G Base-T system. However, this is not meant to be a limitation of the present invention. Hence, the network apparatus 100 may also be applied to other kinds of network systems. All the alternative designs mentioned above belong to the scope of the present invention.

Figure 2:
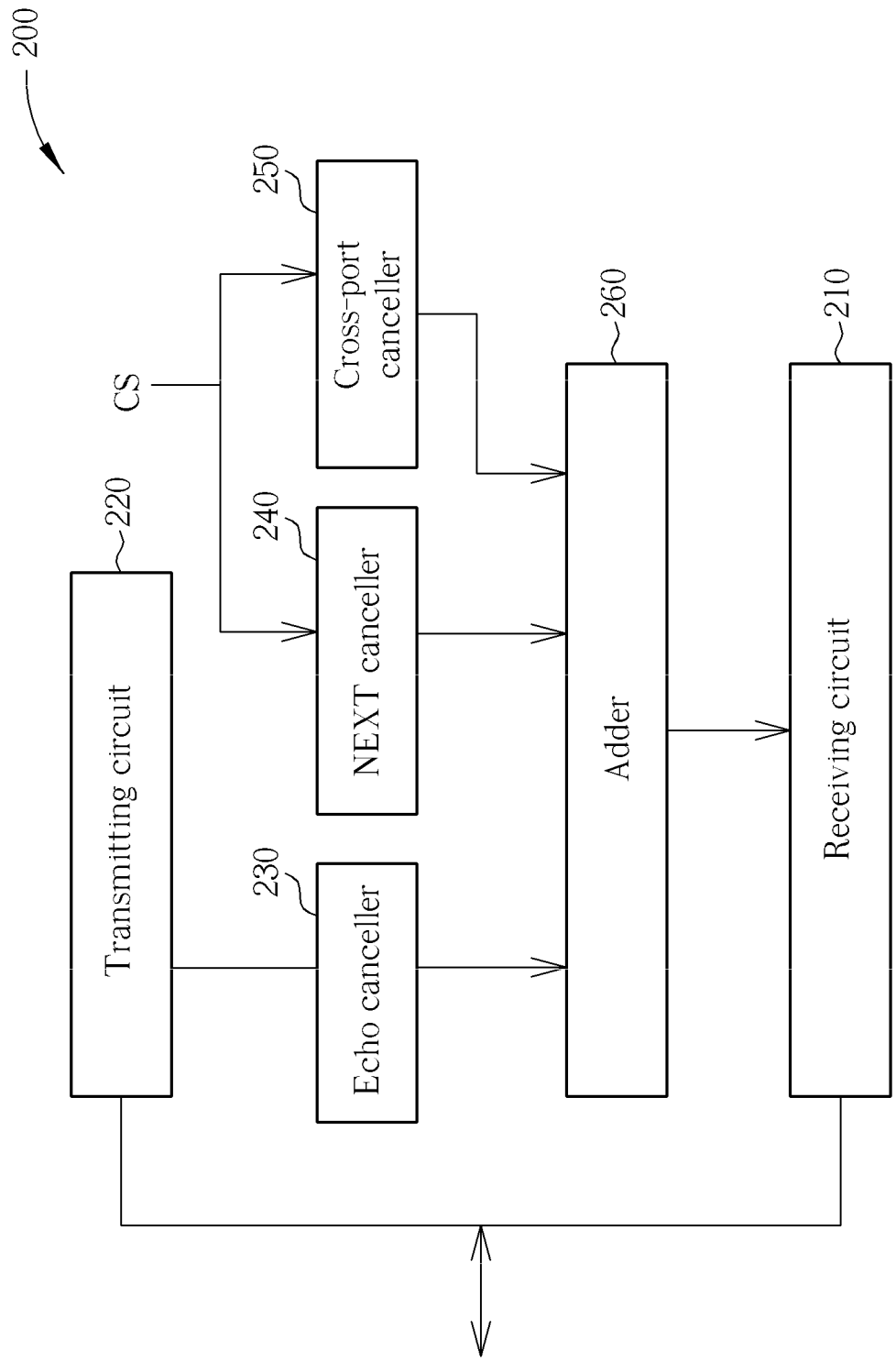
FIG. 2 is a block diagram illustrating an exemplary transceiver corresponding to a specific channel of a specific transport port shown in FIG. 1.

Please refer to FIG. 2, which is a block diagram illustrating an exemplary transceiver 200 corresponding to a specific channel of a specific transport port shown in FIG. 1. The transceiver 200 includes, but is not limited to, a receiving circuit 210, a transmitting circuit 220, an echo canceller 230, a near-end crosstalk (NEXT) canceller 240, a cross-port canceller 250, and an adder 260. Assuming the specific transport port is the transport port A shown in FIG. 1, the echo canceller 230 is arranged to receive an echo signal coming from the transmitting circuit 220 of the specific channel itself, the NEXT canceller 240 is arranged to receive near-end crosstalk coming from other channels of the transport port A, and the cross-port canceller 250 is arranged to receive a cross-port near-end crosstalk coming from all channels of the transport ports B, C, and D. The adder 260 is coupled among the receiving circuit 210, the echo canceller 230, the NEXT canceller 240, and the cross-port canceller 250, and is arranged to receive signals generated from the echo canceller 230, the NEXT canceller 240, and the cross-port canceller 250. Besides, the adder 260 performs an addition operation to generate a processed signal to the receiving circuit 210. Please note that, as one skilled in the art can readily understand the operation principles of the abovementioned receiving circuit 210, transmitting circuit 220, echo canceller 230, and adder 260, further description is omitted here for brevity. In addition, each of the cross-port canceller 250 and the NEXT canceller 240 may be a finite frequency response filter, but this is not meant to be a limitation of the present invention.

In the following, several examples are given to describe how the control unit eliminates the interference/cross-talk between the transport ports according to the comparison result. Please refer to FIG. 1 and FIG. 2 again. When the comparison result CR indicates that a time distance between the first seed and the second seed is less than a threshold, implying that the first seed is going to overlap with the second seed, it is unable to determine precisely whether the signal to be eliminated is generated from the transport port A or the effect of the adjacent transport port B on the transport port A. Hence, the control unit 115 may stop updating a parameter of the NEXT canceller 240 and enable the cross-port canceller 250; when the comparison result CR indicates the time distance between the first seed and the second seed is larger than the threshold, implying that the first seed is going to leave away from the second seed, the control unit 115 may re-enable a parameter updating mechanism of the NEXT canceller 240. It should be noted that, in another embodiment, when a specific transport port enters a power-saving mechanism, implying that the specific transport port (e.g., the transport port C) generates transmission signals not so frequently, the control unit 135 thus may disable the cross-port canceller 250 corresponding to the specific transport port, wherein the power-saving mechanism complies with the Institute of Electrical and Electronics Engineers (IEEE) 802.3az Energy Efficient Ethernet (EEE) standard.

Figure 3:
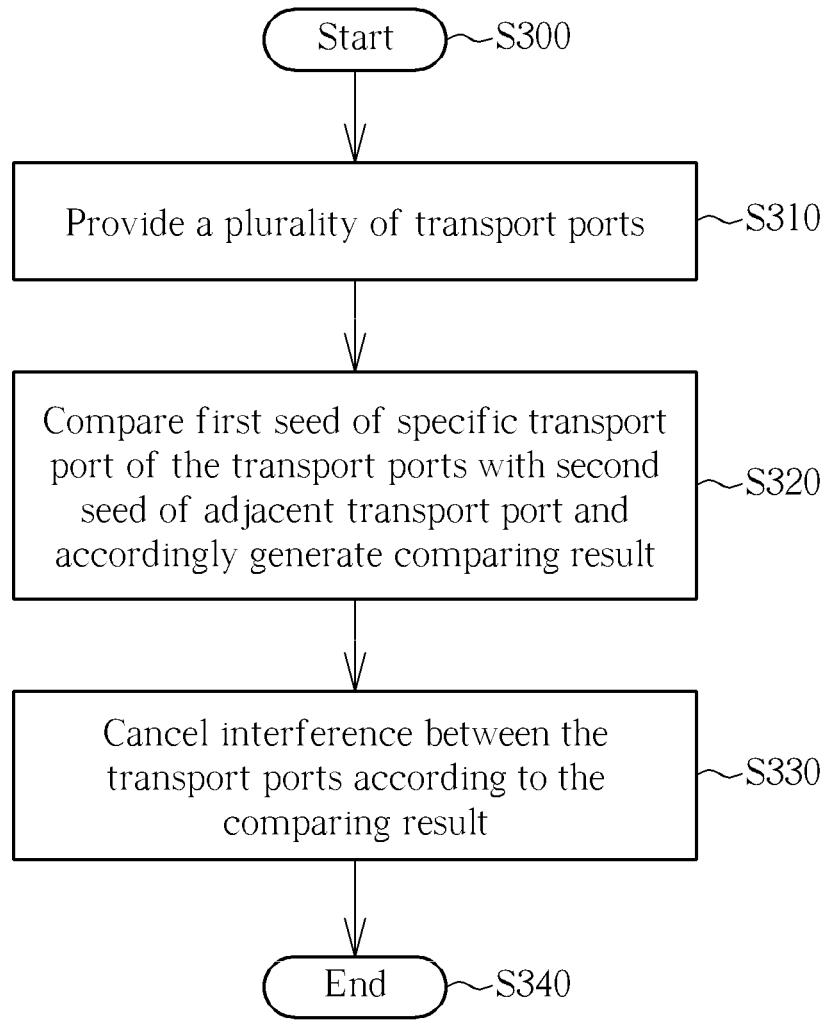
FIG. 3 is a flowchart illustrating an exemplary method for eliminating interference between transport ports according to an embodiment of the present invention.

Please refer to FIG. 3, which is a flowchart illustrating an exemplary method for eliminating interference between transport ports according to an embodiment of the present invention. Please note that, provided that the result is substantially the same, the steps are not required to be executed in the exact order shown in FIG. 3. The exemplary method includes, but is not limited to, the following steps.

Step S300: Start.

Step S310: Provide a plurality of transport ports.

Step S320: Compare a first seed of a specific transport port of the transport ports with a second seed of an adjacent transport port and accordingly generate a comparing result.

Step S330: Cancel interference between the transport ports according to the comparing result.

Step S340: End.

As the operation of each element shown in FIG. 1 can be understood by referencing each step shown in FIG. 3, further description is omitted here for brevity. In addition, the step S320 is performed by a plurality of comparators, and the step S330 is performed by a control unit.

Figure 4:
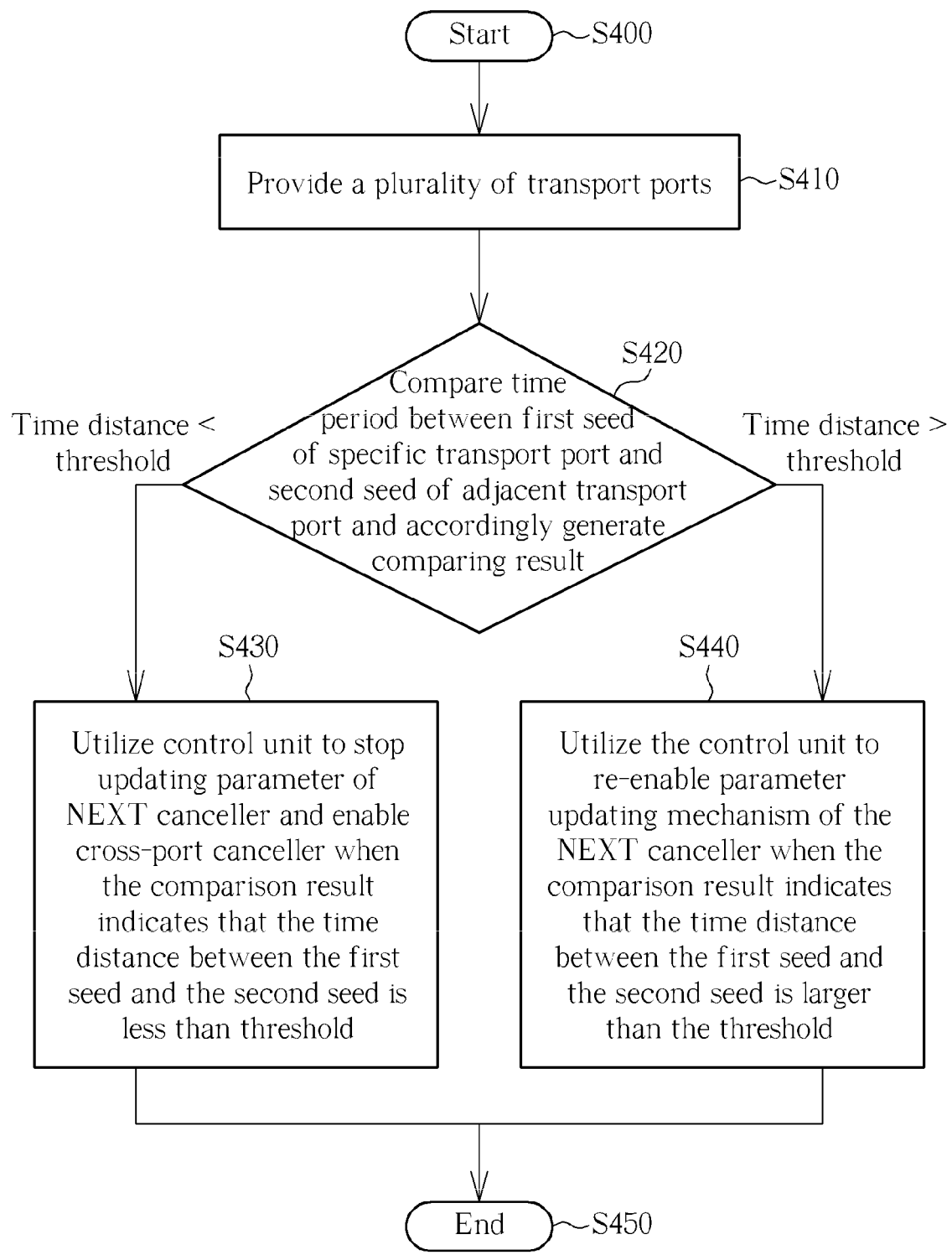
FIG. 4 is a flowchart illustrating another exemplary method for eliminating interference between transport ports according to another embodiment of the present invention.

Please refer to FIG. 4, which is a flowchart illustrating another exemplary method for eliminating interference between transport ports according to another embodiment of the present invention. Please note that, provided that the result is substantially the same, the steps are not required to be executed in the exact order shown in FIG. 4. The exemplary method includes, but is not limited to, the following steps.

Step S400: Start.

Step S410: Provide a plurality of transport ports.

Step S420: Compare a time distance between a first seed of a specific transport port and a second seed of an adjacent transport port, and accordingly generate a comparing result.

Step S430: Utilize a control unit to stop updating a parameter of a NEXT canceller and enable a cross-port canceller when the comparison result indicates that the time distance between the first seed and the second seed is less than a threshold.

Step S440: Utilize the control unit to re-enable a parameter updating mechanism of the NEXT canceller when the comparison result indicates that the time distance between the first seed and the second seed is larger than the threshold.

Step S450: End.

As the operation of each element shown in FIG. 1 and FIG. 2 can be understood by referencing each step shown in FIG. 4, further description is omitted here for brevity. In addition, the step S420 is performed by a plurality of comparators, and the step S430 and S440 are performed by the control unit.

The above-mentioned steps are merely practicable embodiments of the present invention, and in no way should be considered as limitations of the present invention. The methods can include other intermediate steps or several steps can be merged into a single step for making suitable modifications without departing from the spirit of the present invention.

The above-mentioned embodiments are merely used for illustrating the technical features of the present invention, and are not meant to be limitations of the scope of the present invention. As can be seen from the above description, the present invention provides a network apparatus for eliminating interference between transport ports and related method thereof. By using seed information between the transport ports to control the operation of the cross-port canceller and the NEXT canceller, the interference coming from other transport ports may be eliminated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network apparatus, comprising: a plurality of transport ports; a plurality of seed comparators, coupled to the plurality of transport ports,
respectively, wherein a first seed comparator of the plurality of seed comparators is utilized for comparing a first seed of a first transport port with a second seed of a second transport port and accordingly generating a comparing result; and
a control unit, coupled to the first seed comparator, for generating a control signal to cancel interference between the plurality of transport ports according to the comparing result, and determining whether to stop updating a parameter of a near-end crosstalk cancellation of the network apparatus and whether to enable a cross-port cancellation of the network apparatus according to the comparing result,
wherein each of the plurality of transport ports comprises:
a cross-port canceller, coupled to the control unit, for canceling the interference between the plurality of transport ports according to the comparing result; and
at least one near-end crosstalk (NEXT) canceller, coupled to the control unit, for canceling near-end crosstalk from other channels of the transport port that is different from a specific channel of the transport port;
wherein the control unit stops updating a parameter of the NEXT canceller and enables the cross-port canceller when the comparison result indicates that a time distance between the first seed and the second seed is less than a threshold, and the control unit re-enables a parameter updating mechanism of the NEXT canceller when the comparison result indicates that the time distance between the first see and the second seed is larger than the threshold.

2. The network apparatus of claim 1, wherein when the transport port enters a power-saving mechanism, the control unit disables the cross-port canceller corresponding to the transport port.

3. The network apparatus of claim 2, wherein the power-saving mechanism complies with the Institute of Electrical and Electronics Engineers (IEEE) 802.3az Energy Efficient Ethernet (EEE) standard.

4. The network apparatus of claim 1, wherein each of the cross-port canceller and the NEXT canceller is a finite frequency response filter.

5. The network apparatus of claim 1, wherein the first transport port and the second transport port are adjacent transport ports.

6. The network apparatus of claim 1, being applied to a 10M/100M Base-T system, a 1G Base-T system, or a 10G Base-T system.

7. The network apparatus of claim 1, being a switch.

8. A method for eliminating interference between transport ports, comprising:
providing a plurality of transport ports; comparing a first seed of a first transport port with a second seed of a second
transport port and accordingly generating a comparing result;
generating a control signal to cancel interference between the plurality of transport ports according to the comparing result,
determining whether to stop updating a parameter of a near-end crosstalk cancellation and whether to enable a cross-port cancellation according to the comparing result;
providing a cross-port canceller to cancel the interference between the plurality of transport ports according to the comparing result; and
providing at least one near-end crosstalk (NEXT) canceller to cancel near-end crosstalk from other channels corresponding to a transport port that is different from a specific channel of the transport port;
wherein updating a parameter of the NEXT canceller is stopped and the cross-port canceller is enabled when the comparison result indicates that a time distance between the first seed and the second seed is less than a threshold, and a parameter updating mechanism of the NEXT canceller is re-enabled when the comparison result indicates that the time distance between the first seed and the second seed is larger than a threshold.

9. The method of claim 8, wherein when a transport port enters a power-saving mechanism, a cross-port canceller corresponding to the transport port is disabled.

10. The method of claim 9, wherein the power-saving mechanism complies with the Institute of Electrical and Electronics Engineers (IEEE) 802.3az Energy Efficient Ethernet (EEE) standard.

11. The method of claim 8, wherein the first transport port and the second transport port are adjacent transport ports.

* * * * *